United States Patent [19]

Saito et al.

[11] Patent Number: 4,784,791
[45] Date of Patent: Nov. 15, 1988

[54] HALOGEN-SUBSTITUTED PHENYL BENZYL ETHER DERIVATIVES

[75] Inventors: Shinichi Saito; Kazutoshi Miyazawa; Takashi Inukai; Hiromichi Inoue; Kouji Ohno, all of Kanagawa, Japan

[73] Assignee: Chisso Corporation, Osaka, Japan

[21] Appl. No.: 68,332

[22] Filed: Jul. 1, 1987

[30] Foreign Application Priority Data

Jul. 4, 1986 [JP] Japan ................................ 61-157317

[51] Int. Cl.$^4$ ................ G02F 1/13; C09K 19/06; C09K 19/12; C07C 69/76
[52] U.S. Cl. .................... 252/299.6; 252/299.5; 252/299.01; 252/299.66; 350/350 R; 350/350 S; 560/55; 560/59
[58] Field of Search ............ 252/299.6, 299.66, 299.5, 252/299.01; 350/350 R, 350 S; 560/55, 59

[56] References Cited

U.S. PATENT DOCUMENTS

| | | | |
|---|---|---|---|
| 4,576,732 | 3/1986 | Isogai et al. | 252/299.6 |
| 4,668,427 | 5/1987 | Saito et al. | 252/299.6 |
| 4,710,315 | 12/1987 | Schad et al. | 252/299.6 |
| 4,728,458 | 3/1988 | Higulai et al. | 252/299.6 |
| 4,729,847 | 3/1988 | Miyazawa et al. | 252/299.6 |

FOREIGN PATENT DOCUMENTS

| | | | |
|---|---|---|---|
| 84194 | 7/1983 | European Pat. Off. | 252/299.6 |
| 188222 | 7/1986 | European Pat. Off. | 252/299.65 |

OTHER PUBLICATIONS

Gray, G. W., et al., Liquid Crystals & Plastic Crystals, vol. 1, John Wiley & Sons, Inc., pp. 142–143, N.Y. (1974).
C. A. 108:14754, (1/11/88).
C. A. 106:206160t (6/15/87).

Primary Examiner—Teddy S. Gron
Attorney, Agent, or Firm—Wenderoth, Lind & Ponack

[57] ABSTRACT

A novel liquid crystal compound represented by the general formula (I):

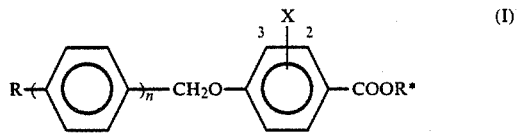

(wherein R is a straight or branched alkyl or alkoxy group having 1 to 20 carbon atoms, R* is an optically active alkyl group having 4 to 20 carbon atoms, X is a fluorine atom or a chlorine atom, and n is 1 or 2), a liquid crystal composition containing at least one liquid crystal compound of the general formula (I), a chiral smectic liquid crystal composition containing at least one liquid crystal compound of the general formula (I), and an optical switching element utilizing the chiral smectic liquid crystal composition containing at least one liquid crystal compound of the general formula (I) are described.

8 Claims, No Drawings

HALOGEN-SUBSTITUTED PHENYL BENZYL ETHER DERIVATIVES

FIELD OF THE INVENTION

The present invention relates to novel liquid crystal compounds, and more particularly, to chiral smectic liquid crystal compounds having an optically active group and chiral smectic liquid crystal compositions containing the same.

BACKGROUND OF THE INVENTION

The TN (Twisted Nematic) type display mode is now most commonly used as a liquid crystal display element. This TN type display mode has many advantages; for example, driving voltage is low and amount of electric power consumed is small. In respect of response rate, however, the TN type display mode is inferior to emissive type display elements such as a cathode ray tube, electroluminescence and plasma display. New TN type display elements in which the twisted angle is changed from 90° to a range of 180° to 270° have been developed. These new elements, however, are still inferior in response rate. Although various attempts to improve the response rate have been made, a TN type display element sufficiently satisfactory in the response rate has not yet been obtained.

It is reported in Clark et al., *Applied Phys. Lett.*, 36, 899 (1980) that in a new display mode utilizing ferroelectric liquid crystals which have been extensively studied in recent years, there is a great possibility that the response rate is greatly improved. This display mode utilizes a chiral smectic phase such as a chiral smectic C phase (hereafter referred to as "SC*") which exhibits ferroelectric properties. It is known that not only the SC* phase but also phases such as chiral smectic F, G, H, and I exhibit ferroelectric properties. When these ferroelectric liquid crystals are utilized as display elements, it is desired for liquid crystal material to have a ferroelectric liquid crystal phase over a wide temperature range including room temperature. At present, a single compound meeting the above requirements has not been known. Only liquid crystal compositions prepared by combining several compounds so as to satisfy the above needed characteristics as much as possible are used.

SUMMARY OF THE INVENTION

As a result of various investigations as to finding a liquid crystal compound useful as a component for the liquid crystal composition, the inventors have achieved the present invention.

Therefore, the present invention provides:

(1) a liquid crystal compound represented by the general formula (I):

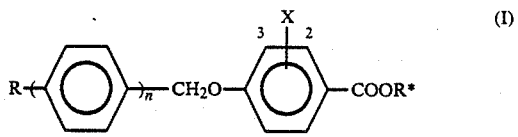

wherein R represents a straight or branched alkyl or alkoxy group having 1 to 20 carbon atoms, R* represents an optically active alkyl group having 4 to 20 carbon atoms, X represents a fluorine atom or a chlorine atom, and n is 1 or 2;

(2) a chiral smectic liquid crystal composition containing at least one liquid crystal compound represented by the general formula (I) as described above; and (3) an optical switching element utilizing a chiral smectic liquid crystal composition containing at least one liquid crystal compound represented by the general formula (I) as described above.

DETAILED DESCRIPTION OF THE INVENTION

The term "liquid crystal compounds" as used herein includes both compounds which can be in the liquid crystal state by themselves and compounds which cannot be in the liquid crystal state by themselves, but are suitable for use as a component of liquid crystal compositions.

In the general formula (I), R represents an alkyl or alkoxy group having preferably 4 to 16 carbon atoms and more preferably 6 to 12 carbon atoms. R* represents an optically active alkyl group having preferably 4 to 12 carbon atoms. X is preferably a fluorine atom and more preferably represents a fluorine atom which is substituted at 2-position of the p-phenylene group (i.e., 2-F).

Typical examples of the compounds represented by the general formula (I) are shown below along with their phase transition temperatures.

TABLE 1

| Sample No. | General Formula (I) | | | | Phase Transition Temperature (°C.) | | | | | Remarks |
|---|---|---|---|---|---|---|---|---|---|---|
| | R | n | X | R* | C | $S_3^*$ | SC* | SA | I | |
| 1 | octyloxy | 1 | 2-F | 2-methylbutyl | ·25.0 | — | — | (·12.8) | · | Example 1 |
| 2 | dodecyloxy | 1 | 2-F | 2-methylbutyl | ·33.0 | — | — | — | · | |
| 3 | decyloxy | 1 | 2-F | 1-methylheptyl | ·14.0 | — | — | — | · | |
| 4 | dodecyloxy | 1 | 2-F | 1-methylheptyl | ·28.0 | — | — | — | · | |
| 5 | octyloxy | 2 | 2-F | 1-methylpropyl | ·60.0 | ·71.8 | ·96.4 | ·116.5 | · | |
| 6 | octyloxy | 2 | 2-F | 1-methylbutyl | ·62.0 | ·95.2 | ·95.4 | ·104.0 | · | |
| 7 | octyloxy | 2 | 2-F | 1-methylpentyl | ·57.9 | ·86.6 | ·89.8 | ·100.0 | · | |
| 8 | octyloxy | 2 | 2-F | 1-methylheptyl | ·55.0 | ·82.3 | ·86.2 | ·92.7 | · | |
| 9 | octyloxy | 2 | 2-F | 2-methylbutyl | ·45.0 | ·52.5 | ·100.5 | ·120.3 | · | |
| 10 | octyloxy | 2 | 2-F | 4-methylhexyl | ·61.5 | (·42.0) | ·110.6 | ·117.8 | · | Example 2 |
| 11 | heptyl | 2 | 2-F | 1-methylheptyl | ·32.0 | (·26.3) | ·34.5 | ·55.8 | · | |
| 12 | heptyl | 2 | 2-F | 2-methylbutyl | ·50.0 | — | ·68.6 | ·95.6 | · | |
| 13 | heptyl | 2 | 2-F | 4-methylhexyl | (·*1) | ·16.0 | ·68.2 | ·86.8 | · | |
| 14 | octyl | 2 | 2-F | 1-methylheptyl | ·32.5 | ·39.3 | — | ·52.7 | · | |
| 15 | octyl | 2 | 2-F | 2-methylbutyl | ·25.0 | — | ·70.5 | ·94.0 | · | |
| 16 | octyl | 2 | 2-F | 4-methylhexyl | (·*1) | ·7.0 | ·75.2 | ·84.3 | · | |
| 17 | nonyl | 2 | 2-F | 1-methylpropyl | ·30.0 | (·25.8) | ·60.0 | ·81.7 | · | |
| 18 | nonyl | 2 | 2-F | 1-methylbutyl | ·16.0 | ·55.8 | ·58.3 | ·66.1 | · | |

TABLE 1-continued

| Sample No. | General Formula (I) | | | | Phase Transition Temperature (°C.) | | | | | Remarks |
|---|---|---|---|---|---|---|---|---|---|---|
| | R | n | X | R* | C | S₃* | SC* | SA | I | |
| 19 | nonyl | 2 | 2-F | 1-methylpentyl | -36.6 | (-36.0) | -50.0 | -61.1 | · | |
| 20 | nonyl | 2 | 2-F | 1-methylheptyl | -28.4 | -37.4 | -48.5 | -50.0 | · | Example 3 |
| 21 | nonyl | 2 | 2-F | 2-methylbutyl | -36.5 | -58.5 | -71.6 | -95.1 | · | |
| 22 | nonyl | 2 | 2-F | 4-methylhexyl | (·*1) | -10.0 | -77.2 | -85.3 | · | |
| 23 | nonyl | 2 | 3-F | 2-methylbutyl | -84.0 | — | (-70.6) | -87.8 | · | |
| 24 | 2-methylbutyl | 2 | 2-F | 1-methylheptyl | -61.0 | — | — | — | · | |
| 25 | 2-methylbutyl | 2 | 2-F | 2-methylbutyl | -53.2 | — | SA (-42.3) | Ch -54.0 | · | |
| 26 | 2-methylbutyl | 2 | 2-F | 4-methylhexyl | -61.0 | — | — | (-41.0) | · | |

In Table 1, (*1) indicates that melting point cannot be measured because of no crystallization. 2-F indicates that a fluorine atom is substituted at 2-position of the p-phenylene group, and 3-F indicates that a flourine atom is substituted at 3-position of the p-phenylene group. The symbol · and the numeral on the right side thereof in the columns of the respective phases of the Table indicate a phase transition point from a phase to that on the right side thereof. The parentheses ( ) indicate a monotropic phase transition temperature.

In Table 1, *1) indicates that melting point cannot be measured because of no crystallization. 2-F indicates that a fluorine atom is substituted at 2-position of the p-phenylene group, and 3-F indicates that a fluorine atom is substituted at 3-position of the p-phenylene group. The symbol . and the numeral on the right side thereof in the columns of the respective phases of the Table indicate a phase transition point from a phase to that on the right side thereof. The parentheses ( ) indicate a monotropic phase transition temperature.

Many of the compounds of the general formula (I) exhibit a liquid crystal phase, particularly a chiral smectic liquid crystal phase and thus are useful as a component of chiral smectic liquid crystal composition. Compounds not exhibiting a liquid crystal phase latently have liquid crystal properties and thus can be used as a component of liquid crystal composition in combination with other suitable liquid crystal components. The compounds of the present invention are characterized in that some of the compounds have a chiral smectic phase in a relatively low temperature range.

The compounds of the general formula (A):

(wherein R, R* and n are the same as defined in the general formula (I)) are disclosed in Japanese Patent Application No. 246470/84 [corresponding to Japanese Patent Application (OPI) No. 149547/85 (the term "OPI" as used herein refers to a "published unexamined Japanese patent application")]. Assuming that in the general formulae (I) and (A), R is an octyloxy group, R* is an optically active 2-methylbutyl group and n is 2 [in the general formula (I), X is a fluorine atom which is substituted at 2- of the p-phenylene group (i.e., 2-F)], the compounds of the general formulae (I) and (A) are compared in respect of phase transition point. That is, the phase transition points of the general formula (I) (i.e., the compound No. 9) are as follows:

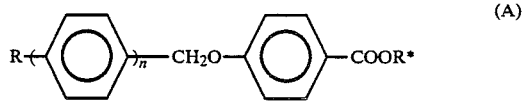

The phase transition points of the compound of the general formula (A) (corresponding to the compound No. 10 in the specification of Japanese Patent Application (OPI) No. 149547/85) are as follows:

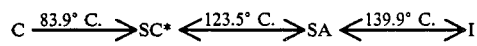

The SC*-SA point and the SA-I point of the compound of the general formula (I) are both about 20° C. lower than those of the compound of the general formula (A). At the same time, the melting point of the compound of the general formula (I) is about 40° C. lower than that of the compound of the general formula (A). In the compound of the general formula (I), a chiral smectic phase of the S₃* phase appears. This phase is different from the SC* phase. The response rate and spontaneous polarization based on the S₃* phase are nearly the same as those of the SC* phase existing at the higher temperature side. Thus, the S₃* phase is useful in a ferroelectric liquid crystal element material like the SC* phase. It can be said, therefore, that the compounds of the general formula (I) are superior to the compounds of the general formula (A) as ferroelectric liquid crystal display element material. In particular, compounds of the general formula (I) wherein R is a straight alkyl group, R* is a 4-methylhexyl group, X is a fluorine atom which is substituted at 2-position of the p-phenylene group (i.e., 2-F) and n is 2, such as the compound Nos. 13, 16 and 22, are preferred in that they exhibit a ferroelectric liquid crystal phase over a wide range including room temperature.

The compounds of the general formula (I) having the characteristics as described above are useful as basic substances for ferroelectric liquid crystal display element material having a wide liquid crystal temperature range including room temperature. Addition of compounds extending the liquid crystal temperature range at the higher temperature side and/or the lower temperature side to the compounds of the general formula (I) provides a more improved ferroelectric liquid crystal composition for display element.

The chiral smectic liquid crystal composition can be prepared by either (1) using a plurality of compounds of the general formula (I) (Example 5) or (2) mixing a compound of the general formula (I) and other optically active or inactive smectic liquid crystals.

These optically active smectic liquid crystals include 4-(1-methylheptyloxycarbonyl)phenyl 4'-octyloxy-4-biphenylcarboxylate, 3-fluoro-4-(1-methylbutyloxycarbonyl)phenyl 4'-octyloxy-4-biphenylcarboxylate, 4'-(1-methylheptyloxycarbonyl)-4-biphenyl 4-octyloxybenzoate, 4'-octyloxy-4-biphenyl 4-(1-methylheptyloxy)benzoate, 4'-octyloxy-4-biphenyl 3-fluoro-4-(1-methylheptyloxy)benzoate, 4-octyloxyphenyl 4'-(1-methylheptyloxy)-4-biphenylcarboxylate, 3-fluoro-4-octyloxyphenyl 4'-(1-methylheptyloxy)-4-biphenylcarboxylate, 2-[4-(6-methyloctyloxy)phenyl]-5-octyl-pyrimidine, 2-[3-fluoro-4-(6methyloctyloxy)phenyl]-5-octyl-pyrimidine, 2-[4-(5-methylheptyloxy)phenyl]-5-octyl-pyridine, 2-[3-fluoro-4-(6-methyloctyloxy)phenyl]-5-octyl-pyridine, 3-fluoro-4-(5-methylheptyloxycarbonyl)phenyl 4-dodecyloxybenzoate and 4-(6-methyloctyloxycarbonyl)phenyl 4-decyloxybenzoate.

These optically inactive smectic liquid crystals include 5-alkyl-2-(4'-alkoxyphenyl)pyrimidines such as 5-octyl-2-(4'-octyloxyphenyl)pyrimidine, 5-octyl-2-(4'-nonyloxyphenyl)pyrimidine and 5-octyl-2-(4'-decyloxyphenyl)pyrimidine; 5-alkyl-2-(4'-alkoxyphenyl)pyridines such as 5-heptyl-2-(4'-octyloxyphenyl)pyridine, 5-octyl-2-(4'-octyloxyphenyl)pyridine, 5-heptyl-2-(4'-nonyloxyphenyl)pyridine and 5-nonyl-2-(4'-nonyloxyphenyl)pyridine; 5-alkyl-2-(4'-alkyl-4-biphenylyl)-pyrimidines such as 5-octyl-2-(4'-hexyl-4-biphenylyl)-pyrimidine, 5-heptyl-2-(4'-pentyl-4-biphenylyl)pyrimidine and 5-hexyl-2-(4'-octyl-4-biphenylyl)pyrimidine; and 4-alkoxyphenyl-4-alkoxy-benzoates such as 4-octyloxyphenyl-4-octyloxy-benzoate, 4-nonyloxyphenyl-4-octyloxybenzoate and 4-decyloxyphenyl-4-nonyloxy-benzoate.

Racemates corresponding to the compounds of the general formula (I) can be prepared in the same manner as in a process for preparation of the compounds of the general formula (I) as described hereinafter with the exception that racemic starting materials are used in place of the starting materials of the compounds of the general formula (I). These racemates exhibit nearly the same phase transition temperature as the corresponding compounds of the general formula (I). However, the racemates exhibit the SC phase in place of the SC* phase and can be added to the compounds of the general formula (I) to adjust the pitch of the chiral smectic phase.

The compounds of the general formula (I) is able to induce the twisted structure when added to a nematic liquid crystal because they have an optically active carbon atom. A nematic liquid crystal having the twisted structure, i.e., a chiral nematic liquid crystal does never produce so-called reverse domains in a TN type display element and thus the compounds of the general formula (I) can be used as agents for preventing the formation of reverse domains.

A process for preparation of the compounds of the general formula (I) of the present invention will hereinafter be explained.

The compounds of the general formula (I) can be prepared, for example, according to the following reaction scheme:

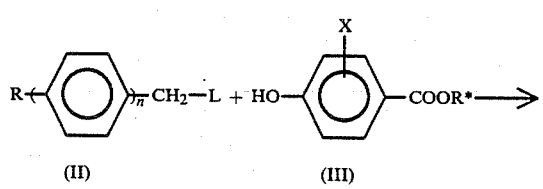

(II)            (III)

-continued

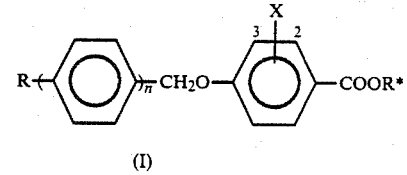

(I)

wherein R, R*, X and n are all the same as defined above, and L represents a leaving group such as a halogen atom, a tosyloxy group and a metasulfonyloxy group.

That is, the compound of the general formula (I) can be prepared by reacting the compounds of the general formula (II) and the compounds of the general formula (III) corresponding to the final objective compounds, which have been previously prepared, in a solvent such as acetone, dimethylformamide (hereafter referred to as "DMF") and dimethyl sulfoxide in the presence of an alkali such as sodium hydride.

Typical examples of the compounds of the (general formula (II) are:

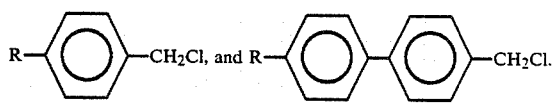

A process for preparation of these compounds is described in detail in the following examples.

The following examples are given to illustrate the liquid crystal compounds and liquid crystal compositions of the present invention in greater detail. However, the present invention should not be construed as being limited thereto.

EXAMPLE 1

Preparation of S-2'-Methylbutyl 2-fluoro-4-(4'-octyloxyphenylenemethyleneoxy)benzoate [the compound of the general formula (I) wherein R is an octyloxy group, n is 1, X is a fluorine atom which is substituted at 2-position of the p-phenylene group (i.e., 2-F), and R* is a 2-methylbutyl group (Sample No. 1)]

(i) Preparation of S-2'-Methylbutyl 2-fluoro-4-hydroxy benzoate

A mixture of 12 g of 2-fluoro-4-hydroxybenzoic acid, 20 g of S-2-methylbutanol, 300 ml of toluene and 5 ml of concentrated sulfuric acid was heated for 6 hours with stirring while at the same time water formed was separated. The reaction mixture was allowed to cool and then 500 ml of water was added. An organic layer was isolated and extracted with 200 ml of a 6 N sodium hydroxide aqueous solution. An aqueous layer was washed with 100 ml of toluene. The aqueous layer was made acidic by adding 300 ml of concentrated hydrochloric acid and then extracted three times with 100 ml of toluene. An organic layer was washed with saturated saline water until it became neutral, dried over anhydrous magnesium sulfate and concentrated to obtain 15 g of S-2'-methylbutyl 2-fluoro-4-hydroxybenzoate.

(ii) Preparation of Objective Compound 0.25 g of sodium hydride (55% in oil) was placed in a flask after decantation with heptane and then with tetrahydrofuran (hereafter referred to as "THF"), and a THF solution of 1.0 g of S-2'-methylbutyl 2-fluoro-4-hydroxybenzoate as obtained in (i) above was introduced in the flask. Then, a DMF solution of 1.0 g of 4-octyloxybenzyl chloride was added, and the resulting mixture was heated for 6 hours on a water bath maintained at 50° C. After the reaction mixture was allowed to cool, 100 ml of toluene was added and further 100 ml of a 2 N sodium hydroxide aqueous solution was added. An organic layer was isolated, washed with 100 ml of a 2 N sodium hydroxide aqueous solution and then washed several times with 100 ml of saturated saline water to make it neutral. The organic layer was dried over anhydrous magnesium sulfate, and then the toluene was distilled away. The residue was purified by column chromatography using 20 g of activated alumina and toluene as an eluting solution and then concentrated. The concentrate was recrystallized twice from 50 ml of ethanol in a refrigerator to obtain 0.5 g of the objective compound, S-2'-methylbutyl 2-fluoro-4-(4'-octyloxyphenylenemethyleneoxy)benzoate. Analysis of the above compound by high performance liquid chromatography (hereafter referred to as "HPLC") showed that the purity of the compound was 99.2%. The compound showed a monotropic SA phase, and its phase transition points were as follows:

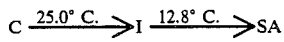

EXAMPLE 2

Preparation of S-4'-Methylhexyl 2-fluoro-4-(4'-octyloxy-4-biphenylyl-methyleneoxy)-benzoate [the compound of the general formula (I) wherein R is an octyloxy group, n is 2, X is a fluorine atom which is substituted at 2-position of the p-phenylene group (i.e., 2-F) and R* is a 4-methylhexyl group (Sample No. 10)]

(i) Preparation of 4'-Octyloxy-4-chloromethylbiphenyl

A mixture of 30 g of 4'-octyloxy-4-formylbiphenyl, 2.0 g of sodium borohydride and 300 ml of isopropanol was stirred on a water bath maintained at 70° C. for 3 hours. 20 ml of 6 N hydrochloric acid and 10 ml of water were added, and the resulting mixture was stirred for 2 hours. The reaction mixture was allowed to cool and filtered to collect solids. These solids were recrystallized from 300 ml of ethanol to obtain 30 g of 4'-octyloxy-4-hydroxymethyl-biphenyl. The total of 4'-octyloxy-4-hydroxymethyl-biphenyl, 100 ml of toluene and 40 g of thionyl chloride were uniformly mixed and allowed to stand overnight at room temperature. Then, the mixture was heated for 30 minutes on a water bath maintained at 70° C. After being allowed to cool, the mixture was poured into ice water and then extracted with 300 ml of toluene. The extract was washed with saturated saline water, with a saturated aqueous sodium hydrogen-carbonate and further with saturated saline water to make it neutral. Then, the extract was dried over anhydrous magnesium sulfate, concentrated and then recrystallized from 300 ml of ethanol to obtain 26 g of 4'-octyloxy-4-chloromethyl-biphenyl having a melting point of 97.3 to 98.0° C. Analysis of the compound by HPLC showed that the purity was 99.6%. (ii) Preparation of Objective Compound 0.4 g of the objective compound, S-4'-methylhexyl 2-fluoro-4-(4'-octyloxy-4-biphenylyl-methyleneoxy)-benzoate, was prepared in the same manner as in (ii) of Example 1, using 1.0 g of the 4'-octyloxy-4-chloromethylbiphenyl as obtained in (i) above, 1.0 g of S-4'-methylhexyl 2-fluoro-4-hydroxybenzoate and 0.25 g of sodium hydride (55% in oil). Analysis of the above compound by HPLC showed that the purity was 99.9%. The compound showed the $S_3^*$ phase, the SC* phase and the SA phase, and its phase transition points are as shown in Table 1.

EXAMPLE 3

Preparation of R-1'-Methylheptyl 2-fluoro-4-(4'-nonyl-4-biphenylyl-methyleneoxy)benzoate [the compound of the general formula (I) wherein R is a nonyl group, n is 2, X is a fluorine atom which is substituted at 2-position of the p-phenylene group (i.e., 2-F) and R* is a 1-methylheptyl group (Sample No. 20)]

(i) Preparation of R-1'-Methylheptyl 2-fluoro-4-hydroxy benzoate 62 g of benzyl chloride was added to a mixture of 73 g of 2-fluoro-4-hydroxy-benzoic acid, 55 g of potassium hydroxide and 300 ml of ethanol, and the resulting mixture was heated with stirring at 60° C. for 4 hours. 250 ml of the ethanol was distilled away, and 200 ml of water and 25 g of sodium hydroxide were added to the residue. The resulting mixture was stirred for 1 hour at 60° C. The reaction mixture was allowed to cool, and after addition of 200 ml of concentrated hydrochloric acid, it was further cooled. Solids formed were collected, filtered with heating using 600 ml of acetic acid, and then recrystallized as it is to obtain 98 g of 2-fluoro-4-benzyloxybenzoic acid having a clearing point of 167 to 169° C. A mixture of 59 g of 2-fluoro-4-benzyloxybenzoic acid and 70 ml of thionyl chloride was heated for 6 hours on a water bath maintained at 50° C. Excessive thionyl chloride was distilled away under reduced pressure. On cooling with water, solids were formed. These solids were dispersed in hexane and then filtered to obtain 61 g of solid. This was 2-fluoro-4-benzyloxybenzoic acid chloride. 36 g of 2-fluoro-4-benzyloxybenzoic acid chloride and 27 g of R-(−)-2-octanol were heated with stirring for 3 hours in an atmosphere of nitrogen. The reaction mixture was allowed to cool and then 200 ml of toluene was added. An organic layer was washed with saturated saline water, with 6 N hydrochloric acid, with saturated saline water, with a 2 N sodium hydroxide aqueous solution and then with saturated saline water to make it neutral. The organic layer was dried over anhydrous magnesium sulfate and concentrated to obtain 1'-methylheptyl 2-fluoro-4-benzyloxy-benzoate. The total of 1'-methylheptyl 2-fluoro-4-benzyloxybenzoate was subjected to hydrogenalysis in ethyl acetate by the use of a 2% palladium-carbon catalyst to obtain R-1'-methylheptyl 2-fluoro-4-hydroxy-benzoate.

(ii) Preparation of 4'-Nonyl-4-chloromethyl-biphenyl 200 ml of a THF solution of 32 g of methyl 4'-nonyl-biphenylcarboxylate was slowly dropped to 300 ml of a THF solution of 3.5 g of lithium aluminum hydride while cooling with ice. After the completion of dropwise addition, the resulting mixture was stirred at room temperature for 2 hours. The reaction mixture was again cooled with ice, and 20 ml of ethyl acetate was slowly dropped thereto. Subsequently, 50 ml of water and 100 ml of 6 N hydrochloric acid were slowly dropped thereto. 300 ml of toluene was added thereto. An organic layer was washed with saturated saline water, with 6 N hydrochloric acid, with saturated saline water, with a 2 N sodium hydroxide aqueous solution and further with saturated saline water to make it neutral. The organic layer was dried over anhydrous magnesium sulfate, concentrated and then recrystallized from 200 ml of ethanol to obtain 28 g of 4'-nonyl-4-hydroxymethyl-biphenyl having a melting point of 101 to 102° C. Analysis of the above compound by HPLC showed that the purity was 99.9%. The total of the compound and 30 g of thionyl chloride were mixed and allowed to stand overnight. Then, the mixture was heated for 30 minutes on a water bath maintained at 70° C. and then allowed to cool. The mixture was poured into ice water and extracted with 300 ml of toluene. The extract thus obtained was washed with saturated saline water, with a saturated sodium hydrogencarbonate aqueous solution and further with saturated saline water, made neutral, dried over anhydrous magnesium sulfate, concentrated, and recrystallized from 300 ml of ethanol to obtain 25 g of 4'-nonyl-4-chloromethyl-biphenyl, having a melting point of 68.0 to 68.4° C. Analysis of the compound by HPLC showed that the purity was 99.8%.

(iii) Preparation of Objective Compound 0.4 g of the objective compound, R-1'-methylheptyl 2-fluoro-4-(4'-nonyl-4-biphenylyl-methyleneoxy)benzoate was prepared in the same manner as in (ii) of Example 1, using 1.0 g of 4'-nonyl-4-chloromethyl-biphenyl obtained in (ii) above, 1.0 g of R-1'-methylheptyl 2-flouro-4-hydroxy-benzoate and 0.25 g of sodium hydride (55% in oil). Analysis of the above compound by HPLC showed that the purity was 99.6%. The compound was a liquid crystal showing the $S_3^*$ phase and the $S_C^*$ phase. Its phase transition points are shown in Table 1.

EXAMPLE 4 (APPLICATION EXAMPLE 1)

A nematic liquid crystal composition comprising:

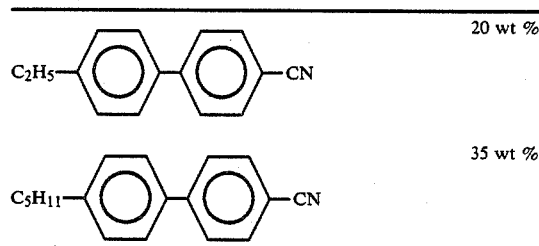

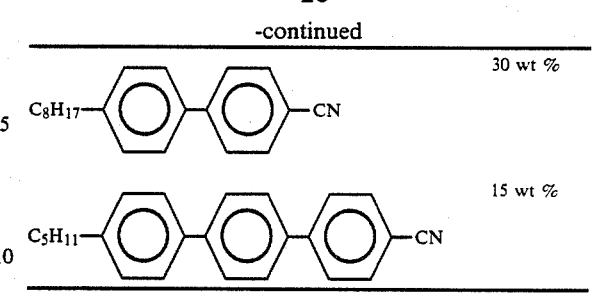

was introduced in a cell with transparent electrodes, the distance between the electrodes being 10 μm, which had been coated with polyvinyl alcohol (PVA) as an aligning agent and had been subjected to parallel aligning treatment by rubbing the surface thereof, to thereby produce a TN type display cell. Observation of the cell under a polarization microscope showed that reverse twist domains were formed.

0.1 wt % of Sample No. 3 of Table 1 as the compound of the general formula (I) of the present invention was added to the above nematic liquid crystal composition. (Sample No. 3 did not show the liquid crystal phase by itself.) The resulting composition was introduced in the same cell as above and observed as a TN type cell in the same manner as above. The reverse twist domain disappeared, and a uniform nematic phase was observed.

EXAMPLE 5 (APPLICATION EXAMPLE 2)

A chiral nematic liquid crystal composition was prepared by adding 1 wt % of Sample No. 8 of Table 1 as the compound of the general formula (I) of the present invention to ZLI-1132 (produced by Merck & Co.), which was a nematic liquid crystal composition on the market, and its chiral pitch was measured. The results are as follows.

| Temperature (°C.) | Pitch (μm) |
| --- | --- |
| 20 | 10.8 |
| 30 | 10.8 |
| 40 | 11.1 |
| 50 | 11.2 |
| 60 | 11.7 |

EXAMPLE 6 (APPLICATION EXAMPLE 3)

The compounds of the general formula (I) of the present invention, Sample Nos. 8, 15, 13, 14 and 20 of Table 1, were mixed in the formulation shown below to prepare a liquid crystal composition.

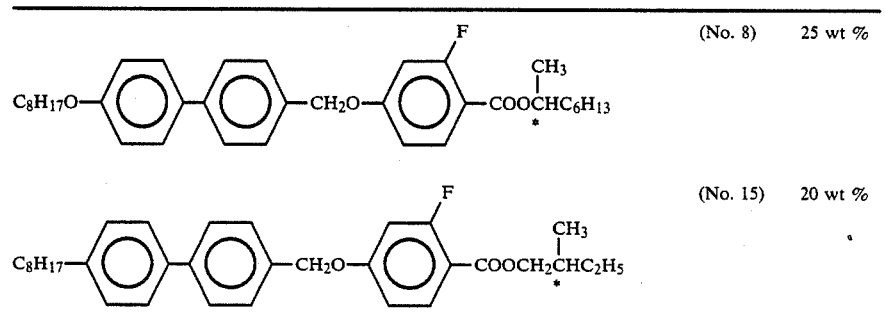

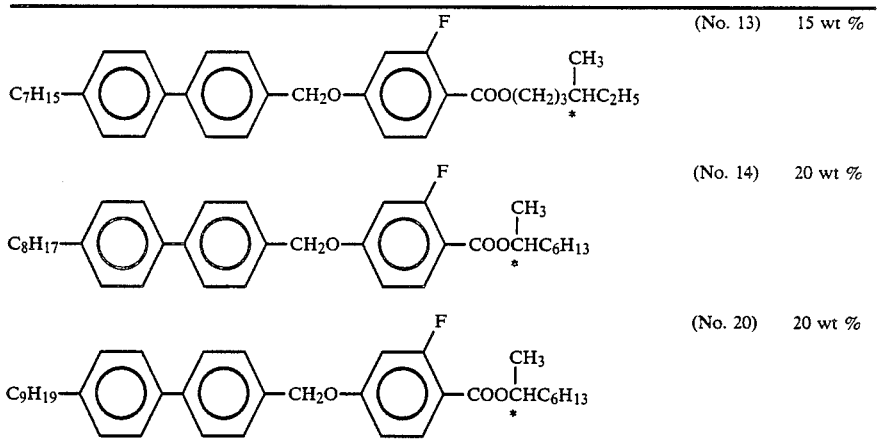

The phase transition temperatures of the above liquid crystal composition were as follows:

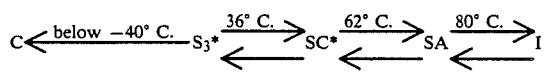

crystallization was observed even at −40 °C. At 25° C., the degree of spontaneous polarization was 40 nC/cm$^2$ and the tilt angle was 21°. This mixture was introduced in a 2 mμ thick cell provided with transparent electrodes, which had been coated with PVA (polyvinyl alcohol) as an aligning agent and has been subjected to parallel aligning treatment by rubbing the surface thereof. This liquid crystal element was placed between two crossed polarizers, and an electric field was applied thereto. At 15 V, a change in transmission light intensity was observed. Based on the change in transmission light intensity, the response time was measured. The response time was about 140 μsec at 25° C.

Thus, it can be seen that when the compounds of the general formula (I) of the present invention are used, there can be obtained a ferroelectric chiral smectic liquid crystal composition which is excellent in response property.

While the invention has been described in detail and with reference to specific embodiments thereof, it will be apparent to one skilled in the art that various changes and modifications can be made therein without departing from the spirit and scope thereof.

What is claimed is:

1. A liquid crystal compound represented by the general formula (I):

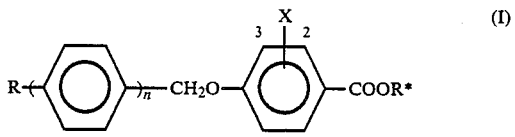

wherein R is a straight or branched alkyl or alkoxy group having 1 to 20 carbon atoms, R* is an optically active alkyl group having 4 to 20 carbon atoms, X is a fluorine atom or a chlorine atom, and n is 1 or 2.

2. The liquid crystal compound as claimed in claim 1, wherein R is an alkyl or alkoxy group having 4 to 16 carbon atoms.

3. The liquid crystal compound as claimed in claim 1, wherein R* is an optically active alkyl group having 4 to 12 carbon atoms.

4. The liquid crystal compound as claimed in claim 1, wherein X is a fluorine atom.

5. The liquid crystal compound as claimed in claim 1, wherein R is an alkyl or alkoxy group having 4 to 16 carbon atoms, R* is an optically active alkyl group having 4 to 12 carbon atoms, and X is a fluorine atom.

6. A liquid crystal composition containing at least one liquid crystal compound represented by the general formula (I):

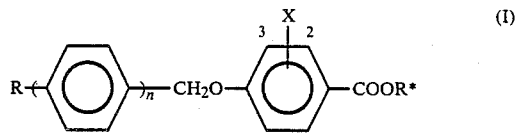

wherein R is a straight or branched alkyl or alkoxy group having 1 to 20 carbon atoms, R* is an optically active alkyl group having 4 to 20 carbon atoms, X is a fluorine atom or a chlorine atom, and n is 1 or 2.

7. A chiral smectic liquid crystal composition containing at least one liquid crystal compound represented by the general formula (I):

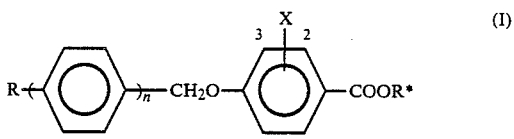

wherein R is a straight or branched alkyl or alkoxy group having 1 to 20 carbon atoms, R* is an optically active alkyl group having 4 to 20 carbon atoms, X is a fluorine atom or a chlorine atom, and n is 1 or 2.

8. An optical switching element utilizing a chiral smectic liquid crystal composition containing at least one liquid crystal compound represented by the general formula (I):

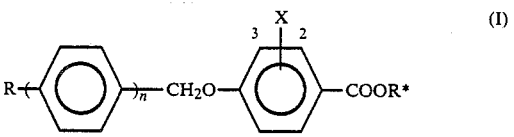

wherein R is a straight or branched alkyl or alkoxy group having 1 to 20 carbon atoms, R* is an optically active alkyl group having 4 to 20 carbon atoms, X is a flourine atom or a chlorine atom, and n is 1 or 2.

* * * * *